INVENTORS.
GLENN A. MARSH
GEORGE A. OLSON
BY
*Edward H. Lang*
ATTORNEY.

United States Patent Office 3,331,021
Patented July 11, 1967

3,331,021
A.C. CORROSION-RATE METER AND METHOD
Glenn A. Marsh and George A. Olson, Crystal Lake, Ill., assignors, by mesne assignments, to Union Oil Company of California, Los Angeles, Calif., a corporation of California
Filed Dec. 31, 1962, Ser. No. 248,390
9 Claims. (Cl. 324—71)

This invention relates to a method and apparatus for measuring instantaneous corrosion rates of specimens exposed to corrosive electrolytes.

Instantaneous corrosion rates can be determined by measuring the change of electrode potential of a metal electrode in comparison with a reference electrode upon application of a small direct current from an external source and an auxiliary electrode. In accordance with the prior art, the current is a direct current which may be applied in one direction only or, better, first in one direction while a first potential measurement is made, and then in the other direction while a second potential measurement is made; whereby the metal electrode is alternately made positive and negative. From the sum of the currents supplied, and the sum of the changes of electrode potential from the normal state, the instantaneous corrosion rate of the metal can be calculated from appropriate formulae. The prior art has found no convenient way to correlate the readings thus obtained with corrosion rates obtained by other methods.

It is a primary object of this invention to provide a new method and apparatus for the measurement of instantaneous corrosion rates. Another object of this invention is to provide a method and apparatus by which instantaneous corrosion rate measurements can be made conveniently and with a high degree of accuracy and reliability. Yet another object of this invention is to provide an apparatus with which instantaneous corrosion rates can be continuously and conveniently measured and recorded.

Figure 1:
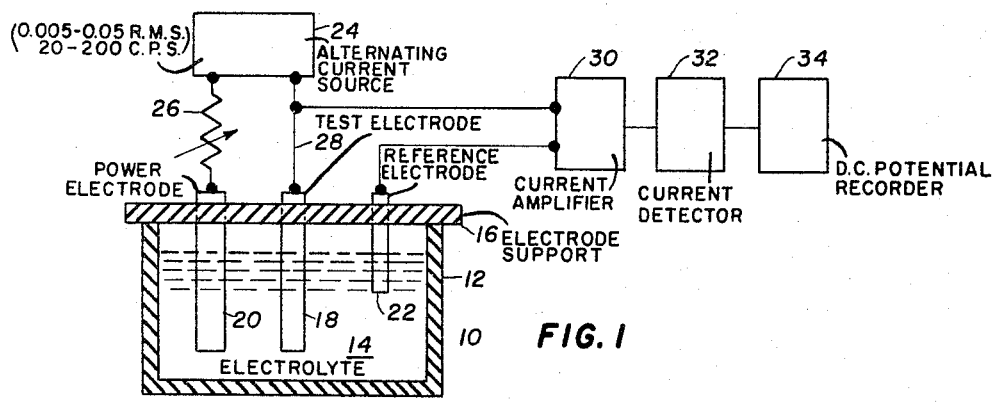
Figure 2:
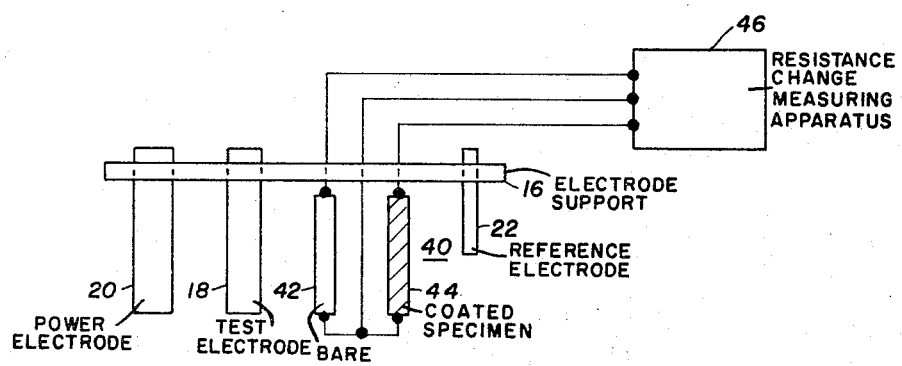
Figure 3:
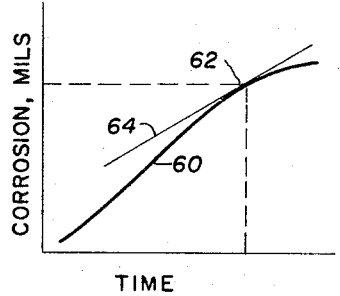
Figure 4:
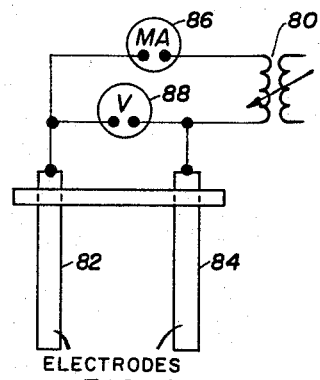

The invention will be described with reference to the drawings of which:

FIGURE 1 is an elevational view, partly in section, of the apparatus of this invention, FIGURE 2 is an elevational view of a modified apparatus used for correlating instantaneous corrosion rate measurements obtained by the method and apparatus of this invention with corrosion rates measured by prior art techniques, FIGURE 3 is a graph showing a relationship between extent of corrosion and time, and FIGURE 4 is an elevational view of an alternate apparatus.

Referring to FIGURE 1, cell 10 comprises vessel 12 which is adapted to contain an electrolyte 14 which provides a corrosive environment, and an electrode-supporting cover 16 which supports electrodes 18, 20, and 22 in electrically insulated relationship. Electrode 18 is fabricated of any metal, the corrosion rate of which in the corrosive environment is to be determined. Power electrode 20 is provided to permit the completion of a power circuit between electrodes 18 and 20, whereby a current may be applied to electrode 18 through the electrolyte. While electrode 20 may be fabricated of any material, it is preferably inert, that is, fabricated of a material such as carbon, graphite, or platinum which undergoes no reaction under the application of an electric potential when exposed to the corrosive environment. In this manner contamination of the corrosive environment with undesired reaction products is avoided. Reference electrode 22 may also be fabricated of any conductive material, but preferably is a reversible electrode such as a calomel electrode, a hydrogen electrode, a copper-copper sulphate electrode, or a silver-silver chloride electrode. The use of reversible reference electrodes is preferred in that more accurate measurements are made possible, since the potential of reversible reference electrodes is not altered by the passage of minute currents to or from the electrode.

Alternating current source 24 is connected across electrodes 18 and 20 by means of conductor 28 and variable resistance 26. Alternating current source 24 is preferably controllable over a voltage range of about 0 to 30 volts and provides an alternating current of 20 to 200 cycles per second. While other frequencies may be used, it has been found that the accuracy of measurement falls off rapidly when the frequency of the applied potential is without the range 20–200 cycles per second. For convenience, 60 cycles per second alternating potential is preferred. Thus, potential source 24 may be a variable transformer or potentiometer employed in conjunction with a conventional house-current outlet. Variable resistance 26 is large, say 1 megohm and, therefore, limits the current between electrodes 20 and 22 to a value substantially independent of the electrolyte resistance. A measuring and sensing circuit comprising alternating current amplifier 30, detector 32, and DC potential recorder 34 is connected across electrodes 18 and 22. Power input (at constant current) is applied between the power and test electrodes, and alternating potential component existing between test electrode 18 and reference electrode 22 is measured.

It has been found in accordance with this invention that when the current flow between the test electrode and power electrode is such as to provide an alternating potential component of less than about 0.05 volt RMS between the test electrode and reference electrode, this potential is a measure of the instantaneous corrosion rate of the test electrode when exposed to the corrosive environment. For convenience of measurement, it is preferred that the current applied between the test electrode and power electrode be sufficient to cause an alternating potential component having a voltage of not less than about 0.005 volt RMS to exist between the test electrode and reference electrode. Optimum accuracy is obtained when the alternating component between the test electrode and reference electrode is in the range of about 0.01 to 0.02 volt.

As thus far described, the method of this invention depends upon the determination of a constant which correlates the alternating potential component measured between the test and reference electrodes with the instantaneous corrosion rate of the test electrode in the corrosive environment. The determination of this constant, upon a theoretical basis, depends upon a consideration of the nature of the corrosion process, as well as upon the metal from which the test electrode is fabricated and the composition of the electrolyte. Since prior art corrosion measurement techniques, including methods such as the weighing of coupons, or the use of electrical resistance corrosion probes, measure an extent of corrosion over a given period of exposure, rather than an instantaneous corrosion rate, correlation of the results obtained by the method of this invention with the results of other corrosion measurement techniques requires something more than direct comparison. For example, an electrical resistance corrosion probe exposed to a corrosive environment for a period of 10 days will indicate an extent of corrosion which, when considered in view of the time factor, will produce an average corrosion rate figure of perhaps 20 mils per year. This, however, is an average figure, and in practice, the corrosion rate in any instant during the 10 day period, such as after the elapse of 24 hours, may be something different from the average rate of 20 mils per year.

In accordance with this invention a method has been devised by which correlation can be made between the instantaneous corrosion rates measured in accordance with the method of this invention, and average corrosion rates measured in accordance with methods of the prior art. Thus the apparatus of this invention may be calibrated to read correctly instantaneous corrosion rates in conventional terms such as mils per year. Referring to FIGURE 2, a modified apparatus is shown for relating the instantaneous corrosion rates measured by the apparatus of FIGURE 1 to the corrosion rates as measured by prior art techniques. A conventional resistance-change type corrosion probe which comprises a bare metallic specimen 42 and a coated specimen 44 is supported by means of electrode support 16. Test electrode 18, power electrode 20, and reference electrode 22 are also supported for exposure to the corrosive environment as was the case in FIGURE 1. For simplicity, the wiring shown in FIGURE 1 has been omitted from FIGURE 2, but it will be understood that the same system is employed with respect to electrodes 18, 29 and 22 to measure potentials which are proportional to the instantaneous corrosion rate of electrode 18. Specimen 42 of corrosion probe 40 is fabricated of the same metal as electrode 18, and therefore is attacked by the corrosive environment at the same rate. The bare speciment 42 and the coated specimen 44 of probe 40 are connected by means of suitable wiring to resistance change measuring apparatus 46, which reads directly the extent of corrosion of bare specimen 42 in any desired units, such as microinches. The resistance change type corrosion probe and the resistance change measuring circuit are of the kind well known in the art, for example, as described in U.S. Patent No. 2,987,685 to Edward Schaschl. The three electrodes and the corrosion probe are exposed to a corrosive environment for a period of time, such as 10 days, during which time the extent of corrosion, as detected by the corrosion probe, is measured and recorded. At regular intervals the instantaneous corrosion rates are measured in accordance with the method of this invention and recorded. Measurements may be made, for example, every day for a period of a week or ten days. The values of total corrosion measured by the prior art technique are then plotted as a function of time to produce a curve such as curve 60 of FIGURE 3. It will be seen that the total elapsed corrosion at any instant is represented by the height of the curve above the time abscissa. The time rate of corrosion is therefore proportional to the slope of the curve, and ordinarily will not be constant. Thus the curve shown in FIGURE 3 is not linear. However, the slope of the curve at point 62, as represented by tangent line 64, has some finite value representing the instantaneous corrosion rate at that point. This point, of course, corresponds to a particular time at which the instantaneous corrosion rate was measured in accordance with the method of this invention. It is thus possible to compare the instantaneous corrosion rates (voltages) measured in accordance with the method of this invention with the slope of the curve produced from a number of total corrosion extent measurements made over a period of time. Comparison may be made graphically or by known methods of analytical geometry. For example, by known mathematical techniques the equation corresponding to curve 60 may be determined, and differentiated with respect to time. This differential equation may then be solved for any instant of time to determine the instantaneous corrosion rate. The equation, of course, will be solved for some time instant at which a measurement of instantaneous corrosion rate was made. Thus it is possible to establish a correlation between the results obtained by the method of this invention and by prior art corrosion measurement techniques. It will be recognized at once that the scale of recorder 34 may be calibrated in terms of corrosion rate, rather than in terms of potential in volts. Amplifer 30 may be provided with a variable gain, and the gain of the amplifier may be adjusted such that the instantaneous corrosion rates recorded will correspond very closely with the corrosion rates obtained by determining the slope of the curve expressing the relationship between corrosion extent and time as determined by the resistance change corrosion probe. Once calibrated, the instrument can be used indefinitely to measure instantaneous corrosion rates provided the same test electrode is employed in each case, the composition and immersed area of the electrode are not changed, and the magnitude of the current applied between the power electrode and the test electrode remains the same. When one of these variables, such as the immersed area of the test electrode, changes, it is necessary to recalibrate the apparatus. This recalibration is performed in the same manner as the original calibration. In making such calibrations it is sufficient that perhaps half a dozen consecutive readings of corrosion extent and instantaneous corrosion rate, over a period of as many hours, be made. In some instances it will be noted that the instantaneous corrosion rates measured are substantially identical. This indicates that the curve expressing corrosion extent as a function of time is substantially linear. In such cases it will be sufficient to make three or four measurements of corrosion extent and instantaneous corrosion rate to calibrate the apparatus.

Referring to FIGURE 4, an alternate apparatus is shown. Variable transformer 80 provides means for applying an alternating potential between electrodes 82 and 84, which are identical test electrodes fabricated of a metal the corrosion rate of which is of interest. Meter 86 provides means for measuring current flow between test electrodes 82 and 84, and meter 88 is a vacuum tube voltmeter. In operation, an alternating potential having a frequency of 20 to 200 cycles per second, and an amplitude in the range 0.005 to 0.03 volt RMS, and preferably about 0.02 volt RMS, is maintained across electrodes 82 and 84. The potential can be accurately measured by the meter 88 and adjusted by controlling transformer 80. Under these conditions, if the potential is maintained constant, the current measured by meter 86 is a function of the instantaneous corrosion rate of the electrodes, and fluctuates proportionally in response to changes in the instantaneous corrosion rate. Calibration of the apparatus can be carried out as described with reference to the apparatus of FIGURE 2.

The embodiments of the invention in which an exclusive property are privileges claimed are defined as follows:

1. The method of determining the instantaneous corrosion rate of a metal in a conductive, corrosive, environment comprising exposing to said environment in spaced relationship a test electrode fabricated of said metal, a power electrode and a reference electrode, flowing between said power electrode and test electrode an alternating current having a frequency in the range of 20–200 cycles per second and a predetermined amplitude sufficient to produce an RMS voltage of 0.005–0.05 volt between said test electrode and said reference electrode, and measuring the alternating potential between said test electrode and reference electrode.

2. The method in accordance with claim 1 in which the applied potential has an amplitude sufficient to produce a voltage of about 0.01–0.02 volt between said test electrode and reference electrode.

3. An apparatus for measuring the instantaneous corrosion rate of a metal comprising a vessel for containing a corrosive environment, a test electrode fabricated of said metal, a powder electrode, and a reference electrode; means for supporting said electrodes in spaced relationship within said vessel, means for flowing an alternating current having a frequency in the range of 20–200 cycles per second and an RMS voltage of 0.005 to 0.05 volt across said power electrode and said test electrode, and means for measuring the alternating component of potential existing between said test electrode and said reference electrode.

4. An apparatus in accordance with claim 3 in which said reference electrode is a reversible electrode.

5. An apparatus in accordance with claim 4 in which said power electrode is a chemically and electrochemically inert electrode.

6. An apparatus in accordance with claim 5 in which the means for measuring potential includes means for recording the potential measured as a function of time.

7. The method of determining the instantaneous corrosion rate of a metal in a conductive, corrosive, environment comprising exposing to said environment in spaced relationship two test electrodes fabricated of said metal, applying between said electrodes an alternating potential having a frequency in the range of 20–200 cycles per second, and an amplitude in the range of 0.005 to 0.03 volt RMS, and measuring the magnitude of current flow between said test electrodes.

8. The method in accordance with claim 7 in which the frequency of said potential is about 60 cycles per second.

9. The method in accordance with claim 8 in which the amplitude of said potential is about 0.02 volt RMS.

References Cited

UNITED STATES PATENTS 3,207,977  9/1965  Ellison et al. _____ 324—30 X

OTHER REFERENCES

Hurst and McCarty: Drilling and Production Practice, American Petroleum Institute, 1941, copy in Group 150, pages 228–232 of pages 228–240 relied on.

RUDOLPH V. ROLINEC, *Primary Examiner.*

WALTER L. CARLSON, *Examiner.*

C. A. S. HAMRICK, C. F. ROBERTS,
*Assistant Examiners.*